(12) United States Patent
Berrada et al.

(10) Patent No.: US 10,711,413 B2
(45) Date of Patent: Jul. 14, 2020

(54) METHOD FOR THE HIGH SPEED INDENTATION OF A RECYCLABLE HEAT EXCHANGER IN A LAND-BASED INFRASTRUCTURE

(71) Applicant: EUROVIA, Rueil Malmaison (FR)

(72) Inventors: Kamal Berrada, Le Pian Medoc (FR); Bertrand Pouteau, Saint Medard en Jalles (FR); Ivan Drouadaine, Saint Medard en Jalles (FR); Sandrine Vergne, Talence (FR)

(73) Assignee: EUROVIA, Rueil Malmaison (FR)

( * ) Notice: Subject to any disclaimer, the term of this patent is extended or adjusted under 35 U.S.C. 154(b) by 0 days.

(21) Appl. No.: 16/336,421

(22) PCT Filed: Sep. 26, 2017

(86) PCT No.: PCT/FR2017/052586
§ 371 (c)(1),
(2) Date: Mar. 25, 2019

(87) PCT Pub. No.: WO2018/055314
PCT Pub. Date: Mar. 29, 2018

(65) Prior Publication Data
US 2019/0276989 A1     Sep. 12, 2019

(30) Foreign Application Priority Data
Sep. 26, 2016   (FR) ...................................... 16 59054

(51) Int. Cl.
*E01C 11/00*     (2006.01)
*E01C 11/26*     (2006.01)
(Continued)

(52) U.S. Cl.
CPC ............. *E01C 11/26* (2013.01); *C04B 24/085* (2013.01); *C04B 26/26* (2013.01); *E01C 7/18* (2013.01);
(Continued)

(58) Field of Classification Search
CPC . E01C 7/18; E01C 7/187; E01C 11/26; E01C 23/065; F24S 20/64; F24T 10/10;
(Continued)

(56) References Cited

U.S. PATENT DOCUMENTS 4,305,681 A * 12/1981 Backlund ................ E01C 11/26
404/95
4,693,300 A    9/1987 Adachi
(Continued)

FOREIGN PATENT DOCUMENTS

DE     202004006198 U1    2/2005
EP         0384094 A1    8/1990
(Continued)

OTHER PUBLICATIONS

French Search Report, dated Feb. 20, 2017, for French Application No. 1659054.
(Continued)

*Primary Examiner* — Raymond W Addie
(74) *Attorney, Agent, or Firm* — Birch, Stewart, Kolasch & Birch, LLP

(57) ABSTRACT

A method for manufacturing a road surfacing on the surface pipes of a heat exchanger device by a) spreading asphalt mix comprising a granular fraction, a hydrocarbon-based binder at a temperature below 160° C., wherein the asphalt mix has a workability of less than 400 N, b) depositing the pipes, said pipes having a crushing strength greater than 3000 N per linear metre of pipe at 100° C., a thermal expansion less than $200 \cdot 10^{-6}$ $K^{-1}$ at 20° C. in such a way as to enable their
(Continued)

Figure 1:
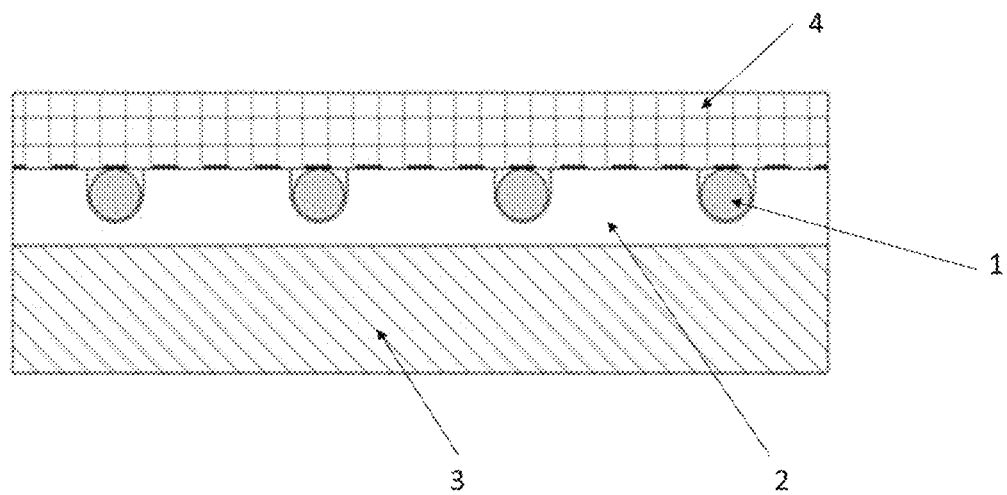

indentation even in the absence of cooling means or pressure application means, c) indenting the deposited pipes into said integration layer by compacting said asphalt mix during the workability period of said asphalt mix, to form an integration layer comprising the pipes of a heat exchanger device, and d) applying a surface layer there above for the road surface.

32 Claims, 2 Drawing Sheets

(51) Int. Cl.

| | | |
|---|---|---|
| *F24S 20/64* | (2018.01) | |
| *F24T 10/10* | (2018.01) | |
| *C04B 24/08* | (2006.01) | |
| *C04B 26/26* | (2006.01) | |
| *E01C 7/18* | (2006.01) | |
| *E01C 23/06* | (2006.01) | |
| *F24T 10/00* | (2018.01) | |
| *C04B 103/00* | (2006.01) | |
| *C04B 111/00* | (2006.01) | |

(52) U.S. Cl.
CPC ............ *E01C 7/187* (2013.01); *E01C 23/065* (2013.01); *F24S 20/64* (2018.05); *F24T 10/10* (2018.05); *C04B 2103/0079* (2013.01); *C04B 2111/00706* (2013.01); *C04B 2111/00732* (2013.01); *F24T 2010/53* (2018.05); *Y02E 10/12* (2013.01)

(58) Field of Classification Search
CPC .... F24T 2010/53; C04B 24/085; C04B 26/26; C04B 2103/0079; C04B 2111/0706; C04B 2111/0732; Y02E 10/12
USPC .................... 404/71, 72; 14/73, 78
See application file for complete search history.

(56) References Cited

U.S. PATENT DOCUMENTS

| | | | |
|---|---|---|---|
| 5,022,459 A | | 6/1991 | Chiles et al. |
| 8,915,242 B2 * | | 12/2014 | Nys ......................... B23P 15/26 |
| | | | 126/651 |
| 2003/0002920 A1 | | 1/2003 | Hildebrand et al. |
| 2004/0033308 A1 | | 2/2004 | Barthel et al. |
| 2006/0230981 A1 | | 10/2006 | Dean |
| 2006/0250886 A1 | | 11/2006 | Dupuis et al. |
| 2008/0146477 A1 | | 6/2008 | Mentink et al. |
| 2008/0250975 A1 | | 10/2008 | Deneuvillers et al. |
| 2009/0088499 A1 | | 4/2009 | Barreto et al. |
| 2010/0154216 A1 | | 6/2010 | Hulen |
| 2013/0068135 A1 | | 3/2013 | Delfosse et al. |

FOREIGN PATENT DOCUMENTS

| | | |
|---|---|---|
| EP | 0524031 A1 | 1/1993 |
| EP | 0552574 A1 | 7/1993 |
| EP | 0690102 A1 | 1/1996 |
| EP | 0781887 A1 | 7/1997 |
| EP | 0900822 A1 | 3/1999 |
| EP | 2062943 A1 | 5/2009 |
| FR | 2721043 A1 | 12/1995 |
| FR | 2732239 A1 | 10/1996 |
| FR | 2852018 A1 | 9/2004 |
| FR | 2855523 A1 | 12/2004 |
| FR | 2883882 A1 | 10/2006 |
| FR | 2891838 A1 | 4/2007 |
| FR | 2901279 A1 | 11/2007 |
| FR | 2910477 A1 | 6/2008 |
| FR | 2939143 A1 | 6/2010 |
| FR | 2945818 A1 | 11/2010 |
| FR | 2950893 A1 | 4/2011 |
| FR | 2965271 A1 | 3/2012 |
| FR | 3054568 A1 | 2/2018 |
| WO | WO 99/11737 A1 | 3/1999 |
| WO | WO 99/34155 A1 | 7/1999 |
| WO | WO 2004/016565 A2 | 2/2004 |
| WO | WO 2005/028756 A2 | 3/2005 |
| WO | WO 2005/081775 A2 | 9/2005 |
| WO | WO 2006/070104 A1 | 7/2006 |
| WO | WO 2006/119354 A1 | 11/2006 |
| WO | WO 2007/112335 A2 | 10/2007 |
| WO | WO 2007/143016 A2 | 12/2007 |
| WO | WO 2011/151387 A1 | 12/2011 |
| WO | WO 2011/153267 A1 | 12/2011 |

OTHER PUBLICATIONS

International Search Report, dated Mar. 19, 2018, for International Application No. PCT/FR2017/052586.

* cited by examiner

METHOD FOR THE HIGH SPEED INDENTATION OF A RECYCLABLE HEAT EXCHANGER IN A LAND-BASED INFRASTRUCTURE

The invention relates to a method for manufacturing a road surfacing comprising on the surface a heat exchanger device aiming to recover thermal energy from roadways or to restore thermal energy to roadways. The invention also relates to a method for recycling such roadways.

Approximately 32 million kilometres of surfaced roads exist in the world. Roadways are more or less flat surfaces, generally of dark colour, which makes them interesting for this invention: their thermal properties mean that they are capable of storing up notable amounts of thermal energy during the day, thanks to the amount of sunshine received. In a global context of development of renewable energies, it seems to make very good sense to recover this free energy captured by roadways.

Among the different materials used for the construction of roadways, in particular poured asphalt, asphalt mix, concrete, macadam or sand, asphalt mix is one of the materials that rises the most in temperature in the course of the day on account of their lower reflectivity and their moderate thermal conductivity.

The use of roadways as thermal collectors for multiple applications is already known: cooling of roadways to avoid the permanent deformation capable of appearing in summer, recovery of the stored up heat to provide energy to adjacent buildings.

The use of geothermy for heating up roadways, in particular for clearing snow from roads in winter (heatable roadways), is also known.

The patent DE 20 2004 006 198 describes a system for the recovery of thermal energy from roadways in which pipes are installed under the road. This system requires a layer of protection of the pipes which impacts the energy performance. Indeed, the pipes are far from the surface course, which constitutes the thermal collector.

The patent application WO99/34155 describes a system for the recovery of thermal energy from roadways in which the pipes are integrated in hot porous bituminous plant mixes (110-160° C.). This application teaches that the bituminous plant mixes have to be porous, or even very porous, to enable the integration of the pipes. An adhesive layer is provided to fill the void spaces between the pipes and the porous asphalt. The pipes have to be cooled, by circulating a pressurised cooling agent, during the integration and the phases of passage of worksite machinery. The cooling of the pipes and their pressurisation makes it possible to protect them thermally, mechanically, and especially to avoid thermal shrinkage during the laying of the pipes in a still hot asphalt mix. Moreover, it is also advisable to control the angle of the pipes with the axis of the rollers of the compactor.

On the worksite, it is expensive and problematic to have to cool down and/or to pressurise the pipes during laying.

Moreover, the adhesive layer, required to fill the void spaces, is unfavourable to the mechanical properties of the asphalt mix.

Finally, according to this method, particular means, costly, must be implemented during the subsequent passage of the caterpillar tracks of pavers or other worksite machinery.

The invention aims to resolve these problems by proposing a method for manufacturing a road surfacing comprising the pipes of a heat exchanger:

Making it possible to indent the pipes with the retained geometry, whatever the curvature of the pipes and being able to comprise bends, loops, etc.

Not leaving void spaces between the pipes and the layer integrating them, thereby not requiring the addition of an adhesive layer to fill the void spaces and/or of filling product;

Not requiring cooling of the pipes by circulation of a cooling agent, during the laying and/or the indentation and/or the subsequent steps of manufacturing the road surfacing including during the passage of worksite machinery; Not requiring a pressurisation of the pipes during the laying and/or the indentation and/or the subsequent steps of manufacturing the road surfacing including during the passage of worksite machinery;

Not requiring a control of the angle of the pipes with the axis of the roller compactor;

Economical, easy to implement, enabling
the installation at high speed of a heat exchanger
the preparation of a road surface that can support all traffic, including heavy traffic.

The method according to the invention also enables optimised thermal exchange, notably by minimising the amount of voids around the pipes of the heat exchanger.

Finally, advantageously, by the method according to the invention, the presence of the heat exchanger device does not limit the recycling of the road surface.

According to the NF P 98-149 Standard, June 2002:

"Recycling" is taken to mean the introduction, in a cycle for manufacturing hot or warm plant mixes, of a given proportion of recovered plant mixes (recycled plant mixes). The recycling may be carried out in a plant or on site. In this latter case, it may be produced, either by thermo-recycling, or by cold milling, hot mixing of aggregates (milled materials) in a self-propelled material, and put back in place.

"thermo-recycling" is taken to mean recycling in place by heating, splitting up, mixing of former plant mix with the necessary correctives (plant mix, aggregates and regeneration binder) and re-use of the mixture obtained.

"milling" is taken to mean an operation of breaking up and removing bound materials using a rotating drum equipped with suitable tools (teeth, picks, knives).

These technical problems are resolved by integrating particular pipes in particular asphalt mix by the method according to the invention.

The present invention thus relates to a method for manufacturing a road surfacing comprising on the surface the pipes of a heat exchanger device, characterised in that it comprises the following steps:

a) spreading at a temperature below 160° C. asphalt mix, comprising a granular fraction, a hydrocarbon-based binder, said asphalt mix being workable, having a workability, measured with a Nynas workability meter at the working temperature of the asphalt mix, of less than 400 N, then b) depositing the pipes, said pipes having a crushing strength greater than 3000 N per linear metre of pipe at 100° C., a thermal expansion less than $200 \cdot 10^{-6}$ $K^{-1}$ at 20° C. such that the pipes can be indented even in the absence of cooling means, then c) indenting the deposited pipes into said integration layer by compacting said asphalt mix during the workability period of said asphalt mix, to form an integration layer comprising the pipes of a heat exchanger device, then d) applying there above a surface layer for the road surface, in particular a surface course.

Asphalt Mix

An asphalt mix is a mixture of a granular fraction, comprising aggregates and sand, and hydrocarbon-based binder applied in one or more layers to constitute the roadway of roads.

Hot asphalt mix is manufactured hot (generally from 130° C. to 170° C.) and applied hot (generally from 110° C. to 160° C.).

Lukewarm asphalt mix meets all the specifications of hot asphalt mix, but is produced and implemented at a temperature of 30° C. to 60° C. lower compared to hot asphalt mix. Thus, warm asphalt mix is manufactured at temperatures ranging from 100° C. to 140° C. and applied at temperatures ranging from 80° C. to 130° C.

The hot or lukewarm asphalt mix is deposited by spreading, for example with a paver or a grader, then compacted.

Asphalt mix has been specially developed for an optimised implementation of the method according to the invention.

Advantageously, the elements of the granular fraction of the asphalt mix has dimensions between 0 mm and 20 mm, advantageously between 0 mm and 14 mm, more advantageously between 0 mm and 10 mm, even more advantageously between 0 mm and 6 mm.

"Solid mineral fractions" is here taken to mean all solid fractions that can be used for the production of asphalt mix notably for road construction, notably comprising natural mineral aggregates (gravel, sand, fines) from quarries or gravel pits, recycled products such as the aggregates of asphalt mix resulting from the recycling of materials recovered during roadworks as well as surplus from asphalt mix units, production scrap, aggregates coming from the recycling of road materials including concretes, slags in particular clinkers, schists in particular bauxite or corundum, rubber crumbs notably derived from the recycling of tyres, artificial aggregates of any origin and coming for example from household waste incineration (HWI) slag, and mixtures thereof in all proportions.

Within the scope of the invention, the granular fraction advantageously comprises:
elements less than 0.063 mm (filler or fines);
sand, of which the elements are between 0.063 mm and 2 mm;
elements, in particular gravels, having dimensions:
between 2 mm and 6 mm;
optionally, between 6 mm and 10 mm;
optionally, between 10 mm and 14 mm;
optionally, between 14 mm and 20 mm.

In particular, the granular fraction advantageously comprises:
elements less than 0.063 mm (filler or fines);
sand, of which the elements are between 0.063 mm and 2 mm;
elements, in particular gravels, having dimensions:
between 2 mm and 6 mm;
optionally, between 6 mm and 10 mm.

Advantageously a small particle size (in particular 0/10, advantageously 0/6) makes it possible to improve the contact between the pipes and the asphalt mix.

The size of the mineral aggregates is measured by the tests described in the NF EN 933-2 Standard (version May 1996).

"Mineral fines" or "filler" is taken to mean any mineral or siliceous filler, passing through a 0.063 mm side square mesh sieve. The fines may be natural or added fines, for example limestone (calcium carbonate) fines, cement or hydrated lime fines, or recovered lime fines.

"Aggregates of asphalt mix" is taken to mean asphalt mix (mixture of aggregates and bituminous binders) coming from the milling of asphalt mix layers, the crushing of slabs extracted from asphalt mix treated roadways, bits of slabs of asphalt mix, asphalt mix waste or asphalt mix production surplus (productions surpluses are materials coated or partially coated in asphalt mixing units resulting from transitory manufacturing phases).

In the granular fraction, the fines content (elements having a size less than or equal to 0.063 mm), advantageously varies from 4% to 15% by volume, compared to the total volume of the granular fraction.

In the granular fraction, the content of elements having a size greater than 0.063 mm and less than or equal to 2 mm, in particular sand, advantageously varies from 15% to 80% by volume, compared to the total volume of the granular fraction.

In the granular fraction, the content of elements having a size greater than 2 mm, advantageously up to 6 mm, varies from 5% to 81% by volume, compared to the total volume of the granular fraction.

In an alternative of the invention, the thermal conductivity, $\lambda$, of the asphalt mix is greater than or equal to 1 W/m·K, advantageously greater than or equal to 1.4 W/m·K, more advantageously greater than or equal to 2 W/m·K. The thermal conductivity will generally be less than 10 W/m·K.

The absence of significant voids around the pipes enables good thermal contact. It is sought to maximise the conductivity of the integration layer when it is wished to capture energy.

For certain applications, such as snow clearance from roadways, it may be sought to orient as much as possible the energy transported by the heat-transfer fluid, circulating in the pipes, towards the surface. An insulating integration layer is then sought in order to minimise any loss of heat elsewhere than to the surface.

Such an insulating layer may be obtained by using particular aggregates.

Thus, in another alternative of the invention, the thermal conductivity, 2, of the asphalt mix is less than 1 W/m·K, advantageously it is less than 0.8 W/m·K, more advantageously less than or equal to 0.7 W/m·K. The thermal conductivity will be generally greater than 0.033 W/m·K.

In this alternative, the granular fraction of the asphalt mix advantageously comprises elements selected from light aggregates of specific gravity less than 2.6 t/m$^3$, advantageously of specific gravity less than 1.6 t/m$^3$.

Advantageously, all or part of the light aggregates are non-absorbent light aggregates having a water absorption coefficient less than 15%. Advantageously, the light and non-absorbent aggregates advantageously have a specific gravity between 1.1 t/m$^3$ and 1.5 t/m$^3$.

In addition to being light, the aggregates are advantageously non-absorbent. The property of "non-absorbent" is characterised by the measurement of the water absorption coefficient. According to the present invention, a non-absorbent aggregate is an aggregate that has a water absorption coefficient less than 15%, advantageously between 3% and 15%, more advantageously between 6% and 13%.

The water absorption coefficient is measured according to the standardised protocol described in the NF EN 1097-6 Standard (version June 2001 completed by the version of February 2006). The "water absorption coefficient" is the ratio of the increase in weight of a sample of aggregates to its dry weight, after passage in the oven, on account of the penetration of water into the pores accessible to water. The water absorption coefficient (in percentage of dry weight) (WA24) is calculated in accordance with the following equation:

$$WA24 = \frac{100 \times (M1 - M4)}{M4}$$

where:
M1 is the weight of saturated aggregates and superficially dry in air, in grams;
M4 is the weight of the test sample dried in the oven in air, in grams.

The weights M1 and M4 are measured according to the following protocol. The aggregates are immersed in water (ambient temperature, in particular 22±3° C.) for a sufficient time (advantageously 24 hours). The aggregates are next recovered, dried with a cloth, spread out in a single-granule layer and left exposed to free air but away from direct sunlight or any other source of heat until the visible films of water have disappeared. The aggregates (M1) are weighed. Next, the aggregates are transferred onto a plate and they are placed in the oven at a temperature of (110±5) ° C. up to constant weight (M4).

The water absorption coefficient is measured by the pycnometer method (the aggregates are loaded into a pycnometer filled with water).

These light and non-absorbent aggregates have furthermore good mechanical strength.

These aggregates advantageously have a void percentage above 50%, the pores being mainly closed pores. Thus, advantageously more than 90% by number of the pores are closed pores, advantageously more than 95%, and up to 100% of the pores are closed pores. These closed pores make it possible to ensure that the binder is not absorbed by the aggregates. Thus, the properties of the plant mix do not evolve more than those of a conventional plant mix. The void percentage is advantageously greater than 60%, more advantageously between 65% and 80%, even more advantageously between 65% and 75%. The void percentage may be determined by the geometric method, such as that described in the NF EN 12697-6 Standard of August 2012, or by a gamma densimetry method, such as that described in the NF EN 12697-7 Standard of June 2003.

These light and non-absorbent aggregates are advantageously expanded slate, in particular Mayenne expanded slate. More advantageously, these aggregates are the aggregates sold by the Granulats Expansés de la Mayenne Company under the tradename Granulex®.

Asphalt mix includes a binder. The binder is that which makes it possible to bind the aggregates together and to ensure good mechanical strength of the roadway. A binder may be bituminous or plant based or synthetic. The binder may also be a mixture of binders derived from these different origins.

"Binder" is taken to mean a hydrocarbon-based binder, advantageously of fossil origin, or any binder of plant or synthetic origin, which can be used for the production of a hydrocarbon-based mix. Advantageously, it is any composition containing bitumen, optionally a workability additive and optionally one or more additives and/or one or more emulsifiers and/or one or more viscosifiers and/or one or more fluxing agents and/or one or more plastifiers and/or any other additive making it possible to adjust the properties thereof, such as for example the adhesiveness. As an example, bitumens, bitumens modified by elastomers and/or plastomers may be cited.

The binder may be of any grade. The binder may be a hard or soft binder.

In an advantageous alternative of the invention, road binders meeting the NF EN 12591 (2009, pure bitumens) or NF EN 13924 (2006, hard bitumens) or NF EN 14023 (2010, polymer modified bitumens) Standards will be used.

Advantageously, the binder is 35/50 grade.

Advantageously, the binder also comprises a polymer.

The "polymer" modifying the binder that is referred to here may be selected from natural or synthetic polymers. It is for example a polymer of the family of elastomers, synthetic or natural, and in an indicative and non-limiting manner:

random copolymers, multi-sequenced or star-shaped, of styrene and butadiene or isoprene in all proportions (in particular block copolymers of styrene-butadiene-styrene (SBS), of styrene-butadiene (SB, SBR for styrene-butadiene rubber), of styrene-isoprene-styrene (SIS)) or copolymers of the same chemical family (isoprene, natural rubber, etc.), optionally cross-linked in situ, copolymers of vinyl acetate and ethylene in all proportions, copolymers of ethylene and esters of acrylic acid, methacrylic or maleic anhydride, copolymers and terpolymers of ethylene and glycidyl methacrylate and polyolefins, in particular polyethylene.

The polymer is advantageously selected from random copolymers, multi-sequenced or star shaped, of styrene and butadiene or isoprene, copolymers of vinyl acetate and ethylene and polyethylene.

The polymer modifying the bitumen may be selected from recovered polymers, for example "rubber crumbs" or other rubber-based compositions reduced into pieces or into powder, for example obtained from used tyres or other polymer-based waste (cables, packaging, agricultural waste, etc.) or instead any other polymer commonly used for the modification of bitumens such as those cited in the Technical Guide written by the Association Internationale de la Route (AIPCR) and published by the Laboratoire Central des Ponts et Chaussées "Use of Modified Hydrocarbon-based binders, Special Bitumens and Bitumens with Additives in Road Pavements" (Paris, LCPC, 1999), as well as any mixture in any proportion of these polymers.

In the case of polymer from reclamation, in particular from waste, practically it could be added during the asphalt mix preparation, for example with the solid mineral fraction.

The polymer content in the binder advantageously varies from 2% to 20% by weight, more advantageously from 2% to 10% by weight, even more advantageously from 4% to 8% by weight, compared to the total weight of binder.

In the asphalt mix according to the invention, the binder content advantageously varies from 7.5% to 24% by volume, compared to the total volume of the plant mix, more advantageously from 11% to 23% by volume.

The asphalt mix according to the invention is deposited by spreading, for example with a paver or a grader, then compacted. This compacting makes it possible to reduce the void content (V), after implementation and cooling, to less than 15%, more advantageously to less than 10% (cf. NF EN 12697-5, -6, -8 Standards of 2012).

The asphalt mix used in the method according to the invention is workable. Particularly suitable hydrocarbon-based mixes have a workability, measured with a Nynas workability meter at the working temperature of the asphalt mix, of less than 400 N, advantageously of less than 350 N, more advantageously of less than 300 N, even more advantageously of less than 250 N. The workability is generally greater than 50 N at the working temperature of the asphalt mix.

The asphalt mix used in the method according to the invention is also, advantageously, compact.

In order to guarantee good contact and thereby enable sufficient thermal coupling between the asphalt mix and the pipe, the compactness of the asphalt mix formula measured by means of a gyratory shear press at 60 gyrations, according to the NF EN 12697-31 Standard of August 2007 is advantageously greater than 90%, more advantageously greater than 93%. The compactness may go up to 99.9%.

It will be recalled that C+V=100.

Various methods may be implemented, singly or jointly, to improve the workability of the asphalt mix.

In a first method, a workability additive may be added to the binder.

This workability additive may be an additive having a melting point above 60° C. and below 130° C. Such an additive has a melting point above 60° C., advantageously above 80° C. Such an additive has a melting point below 130° C., advantageously below 120° C. Such an additive makes it possible to confer workability to the hydrocarbon-based mixes.

This additive makes it possible to reduce the viscosity of the binder in order to lower the manufacturing and implementation temperature of the asphalt mix while conserving the required mechanical properties, to improve the workability, to improve the compactness.

In particular, such an additive is at least one trigylceride of fatty acids, said fatty acid being selected from the group constituted of saturated fatty acids, comprising from 12 to 30 carbon atoms, advantageously from 12 to 20 carbon atoms, and which can be substituted by at least one hydroxyl function or by a $C_1$-$C_4$ alkyl radical. A saturated fatty acid does not contain unsaturations (double or triple carbon-carbon bonds). In particular, the fatty acid is selected from the group constituted of saturated fatty acids comprising from 12 to 30 carbon atoms, optionally substituted by at least one hydroxyl function or by a $C_1$-$C_4$ alkyl radical, in particular the fatty acid is selected from the group constituted of 12-hydroxy-octadecanoic acid, hexadecanoic acid, octadecanoic acid, 9,10-dihydroxy-octadecanoic acid, icosanoic acid, nonadecanoic acid, and mixtures thereof.

The workability additive is advantageously a triglyceride of fatty acids, the fatty acid being advantageously selected from the group defined previously. In particular, the additive comprises at least one triglyceride of which a molecule of fatty acid is constituted of 12-hydroxy-octadecanoic acid. Such an additive is for example described in the patent application EP 2 062 941.

The additive content will advantageously be between 1% and 6% by weight compared to the total weight of binder.

Other workability additives are also known.

As other additive may also be cited waxes of animal or plant origin or hydrocarbon waxes, in particular long chain (more than 30 carbon atoms) hydrocarbon waxes. In particular, hydrocarbon waxes may be cited based on polyethylene or also hydrocarbon wax obtain by Fischer Tropsch synthesis (such as the Fischer Tropsch wax sold under the tradename Sasobit® by the Sasol Company), of molecular weight above 400 g/mol and below 6 000 g/mol. Such waxes are for example described in the U.S. Pat. No. 6,588,974, FR 2 855 523, EP 1 017 760, EP 690 102.

As other additive, it is also possible to introduce a derivative of fatty acid selected from the group constituted of fatty acid diesters, fatty acid ethers, amide waxes, diamide waxes and mixtures thereof.

The binder, according to this alternative, advantageously contains 1 to 6% by weight of said wax compared to the total weight of binder.

As workability additive, it is also possible to introduce a natural resin, optionally modified, of plant origin.

The majority of natural resins or modified natural resins of plant origin do not have a determined melting point but have a softening zone. The resin advantageously has a softening point below 130° C., even more advantageously below 120° C. and further advantageously above 65° C.

The binder advantageously contains 1 to 6% by weight of said resin of plant origin compared to the total weight of binder.

The resin of plant origin is advantageously selected from the group constituted of natural rosins or modified natural rosins, rosin esters, rosin soaps, terpenes, tall oil, dammar, acaroid resins. The resin of plant origin is more particularly a rosin resin, for example the glycerol ester of maleic rosin. For example the additives described in the patents FR 2 945 818, FR 2 965 271 may be cited.

The additives described in the patents EP 2 062 943, FR 2 939 143, FR 2 901 279 may also be cited.

The workability additive may not have a melting point/change of state in the temperature range of interest. For example, it is possible to introduce a fluxing agent, also called fluxing oil, based on animal or plant based fatty matter (oils and greases). The fluxing oil may be a vegetable oil, distillation residue of a vegetable oil, one of the derivatives thereof such as its fatty acid part, a mixture of fatty acids, a product of transesterification (by a $C_1$-$C_6$ alkanol) such as a methyl ester of a vegetable oil or an alkyd resin derivative of the vegetable oil. The vegetable oil comprises unsaturated fatty chains. Such oils are for example described in the patents FR 2 910 477, EP 900822, FR 2 721 043, FR 2 891 838.

Fluxing agents such as those described in the patents WO2006/070104, WO 2011/151387 and FR16/57180 (application not yet published) could also be used.

It is also possible to envisage additives reducing surface tension at the binder/aggregate interface (better wettability). For example the additives described in the patent applications FR 2 883 882, EP 1 716 207, EP 1 915 420 may be used.

Superabsorbent polymers, such as those described in the patent application FR 2 950 893, could also be used.

Workable asphalt mix may also be obtained without addition of workability additive.

Thus, the binder may be expanded into foam by the use of water. The water may be the residual water of the aggregates or additives that vaporises on contact with the hot aggregates and binder to foam the binder without pressure.

An example of additive is a zeolite, natural and/or synthetic, or its initial amorphous synthetic phase, as described for example in the patent application WO2004/016565.

Zeolite is capable of releasing under the action of heat (that is to say at a temperature above 110° C.) water molecules that are found between the layers or the interstices of its crystalline lattice. The zeolite used is advantageously a synthetic zeolite of the type A, P, X and/or Y. Preferably, a zeolite granule of type A will be used, notably of empirical formula $Na_{12}(AlO_2)_{12}(SiO_2)_{12}$, 27 $H_2O$ where $Na_2O$ is 18%, $Al_2O_3$ 28%, $SiO_2$ 33% and $H_2O$ 21%.

It is also possible to produce a foam by introducing pressurised air and water into the binder.

Another means is to sequence the asphalt mix preparation, as is for example described in the patents EPO 384 094, EP 0524031, EP 0781887, EP 0 552 574, FR 2 732 239, EP 1 668 184.

Furthermore, the asphalt mix is advantageously resistant to rutting, more advantageously with a percentage rutting after 30,000 cycles of less than 7.5%, advantageously of less than 5%.

The system is thereby suited to road traffic, including heavy traffic.

If need be, to optimise the rutting resistance, advantageously a binder to which polymers have been added will be used, such as described previously.

When the hydrocarbon-based mixes include a change of state workability additive, this additive is also going to make it possible to ensure good rutting resistance.

Polyphosphoric acid could also be added, as for example described in the patents WO2007/143016, WO2011/153267, WO2006/119354, FR 2 852 018.

The asphalt mix according to the invention may also comprise one or more additive(s). Additives may be added either to the binder, or to the aggregate, or to the asphalt mix.

The additives may also be used for aesthetic purposes, notably for a change of colour of the final road products. It may thus be a pigment, natural or not, such as iron oxide.

Heat Exchanger Device:

The heat exchanger device comprises pipes, in which at least one heat-transfer fluid is going to be able to circulate.

The pipes are advantageously made of polymer. Indeed, it is desirable that the presence of the device in the road surface does not impact its recyclability. The polymer is selected as a function of the application temperature of the hydrocarbon-based mixes. A polymer having a melting or softening or glass transition point above the application temperature of the hydrocarbon-based mixes is chosen.

An important characteristic of these pipes is their crushing strength and their thermal expansion.

The crushing strength is the force obtained when the pipe is crushed in such a way that its external diameter is divided by two compared to its initial diameter.

The pipes have a crushing strength greater than 3000 N per linear metre of pipe at 100° C., advantageously greater than 4500 N, more advantageously greater than 10,000 N.

In particular, the pipes have a crushing strength between 3000 N and 100,000 N, advantageously between 4500 N and 100,000 N, more advantageously between 10,000 N and 100,000 N, per linear metre of pipe at 100° C.

The thermal expansion of the pipes is advantageously less than $200 \cdot 10^{-6}$ $K^{-1}$ at 20° C., more advantageously less than $160 \cdot 10^{-6}$ $K^{-1}$ at 20° C. The thermal expansion of the pipes is generally greater than $10 \cdot 10^{-6}$ $K^{-1}$ at 20° C.

Indeed it has been noted, in a surprising manner, that in the asphalt mix according to the invention, when the pipes have such a crushing strength and such a thermal expansion, during the passage of the compactor, the pipes are indented without being deformed and remain in place, even at the level of the bends. It is not necessary to fill them with a cooling liquid or any other means of thermal and/or mechanical protection and/or pressurisation of the pipes. This constitutes a significant economic advantage.

During the works, the ends of the pipe could remain open on the outside and the pipes will be simply filled with ambient air. It is thus possible to say that the pipes are laid empty.

However, the circulation of water, advantageously at a temperature below 80° C., in particular ranging from 5° C. to 30° C., in the pipes, could be envisaged during the indentation, that is to say during step c) or after indentation and before application of the subsequent layer, that is to say after step c) and before step d).

For a same polymer, the rigidity of the pipes, and thereby the crushing strength, could be increased by increasing the wall thickness of the pipes.

Advantageously, the hot shrinkage of the pipes, measured according to the NF EN ISO 2505 Standard, of 2005, is less than 3% (in an oven, at 150° C. for 60 min), more advantageously less than 2%.

Another advantageous characteristic of the pipes is their adherence to the binder. It is considered that the pipes adhere to the bitumen when the following criterion is met: the pipes are smeared with a 50/70 bitumen cationic emulsion dosed to 65% by weight of bitumen, during this operation if the emulsion does not form beads on the surface the adherence of the pipe is sufficient.

Such pipes adhere to the hydrocarbon-based mixes according to the invention and are thus more easily indented during compacting.

As an example of suitable polymer may be cited high density polyethylene, cross-linked high density polyethylene, polypropylene, ethylene-propylene block copolymers.

The pipes of the device advantageously have a diameter ranging from 5 mm to 30 mm. The pipes of the device advantageously have a wall thickness ranging from 1 mm to 5 mm.

The pipes are advantageously shaped beforehand to the desired geometry. Thus, the method according to the invention comprises a step in which a geometry is imposed on the pipes of the heat exchanger device before the deposition step b).

This step may be carried out beforehand in a factory or in a roadside workshop.

The geometry imposed may be any geometry making it possible to optimise thermal exchanges from groundwater in operation, notably as a function of the desired applications. The method according to the invention makes it possible to indent the pipes whatever their curvature and thereby offer great flexibility on the geometry.

From a thermal viewpoint, exchanges are favoured when the indented pipes of the device form a pattern comprising N straight parallel lines substantially of same length and N−1 bends of which the angle of curvature may vary from 90° to 180°. The spacing between the parallel straight lines will advantageously be from 10 cm to 45 cm, more advantageously from 20 cm to 40 cm.

Before step b), the pipes could be free or positioned on a substrate.

When they are free, their geometry is advantageously imposed by shape memory. Otherwise, the substrate serves to maintain the geometry and thereby facilitate the positioning of the pipes by supporting them.

The substrate is for example constituted of a synthetic geo-material, such as a geotextile or a geogrid, constituted of polymer, optionally bitumen, optionally mineral or organic fibres, woven or non-woven. The substrate is preferably permeable to water and to the bitumen emulsion to favour bonding. The fibres may in particular be glass fibres.

The substrate may remain in the integration layer or be removed after step b) or c).

The substrate remaining in the integration layer after the indentation also makes it possible to reinforce the structure of said layer.

The materials constituting the pipes and the substrate advantageously enable a simultaneous recycling of the asphalt mix of the integration layer, optionally the other layers, of the pipes and of the support, when it is present, when the road surface is raised, for example following a milling operation. In particular, the heat exchanger device indented into said integration layer does not comprise any metal element.

The device is advantageously conditioned in slabs or in rolls, more advantageously in rolls. Conditioning in slabs limits the dimensions to ensure delivery by lorry: the maximum dimensions of a cargo are a length of 12 m for a width of the order of 2.60 m.

It is preferably factory conditioned but it may be prepared in a roadside workshop.

Conditioning in slabs or rolls enables the laying of the device at the same time as the roadway is laid and makes it possible to ensure speeds compatible with the advancement of the roadworks.

Conditioning in slabs or rolls also makes it possible to limit the elements introduced into the roadway in order to conserve the mechanical properties of the road.

In operation, a heat-transfer fluid circulates in the pipes of the heat exchanger device. The heat-transfer fluid may be water or water containing glycol to reduce the freezing point and cold resistance. Water containing a non-harmful glycol of mono-propylene glycol type is preferred, as recommended by the NF X10-970 Standard of January 2011.

Additives, notably fungicidal and bactericidal additives, could be added to the heat-transfer fluid. Thus, a surface treatment of the pipes, such as an anti-oxygen barrier which could be unfavourable to adhesion, is avoided.

DETAILED DESCRIPTION OF THE METHOD

The method according to the invention is characterised in that the pipes of a heat exchanger device are integrated in a layer of asphalt mix, designated integration layer, by indentation. This integration layer could support all traffic, including heavy traffic.

The integration layer is next recovered from at least one road surface layer:
  i. adapted to traffic, from light traffic to heavy traffic as a function of the compositions of the layers of the roadway
  ii. that is going to capture solar energy (in energy recovery mode) or which will be to heat up (in energy restitution mode)

The road could be of large surface area, which would provide a heat exchanger of large dimensions.

To optimise energy efficiency, the integration layer is close to the surface. In particular, the combined thickness of the layer(s) applied thereafter on said integration layer is less than 30 cm, advantageously less than 10 cm. It may for example vary from 2 cm to 30 cm, advantageously from 6 cm to 10 cm.

The road surface layer could comprise a multilayer constituted of at least one binder course and one surface course.

In an alternative, the binder course has a thickness ranging from 4 cm to 14 cm, advantageously from 4 cm to 7 cm.

In an alternative, the surface course has a thickness ranging from 2 cm to 10 cm, advantageously from 5 cm to 7 cm.

For all the thicknesses, unless indicated otherwise, it is the thickness after compacting.

The method according to the invention makes it possible to integrate the pipes of the heat exchanger device in an integration layer during the laying of the roadway integrating said integration layer.

The pipes are indented into the integration layer during the implementation period of the asphalt mix of the integration layer, before the end of compacting. This implementation period is defined by the workability of the asphalt mix.

A successful indentation depends both on the workability of the asphalt mix and the crushing strength of the pipe. The greater the crushing strength of the pipe, the wider the tolerance threshold on the workability of the asphalt mixes. The more workable the asphalt mix, the wider the tolerance threshold on the crushing strength of the pipes.

However, whatever the workable asphalt mix, the pipe has a crushing strength greater than 3000 N per linear metre of pipe at 100° C.

However, whatever the pipe, the minimum workability of the asphalt mix, measured with a Nynas workability meter at the working temperature of the asphalt mix, is less than 400 N.

In one embodiment of the invention, the workability of the asphalt mix is between 300 N and 400 N. Then, the crushing strength of the pipes is greater than 4500 N per linear metre of pipe at 100° C.

In another embodiment of the invention, the workability of the asphalt mix is less than 300 N. Then, the crushing strength of the pipes is greater than 3000 N per linear metre of pipe at 100° C.

The indentation depth advantageously varies from 0.5 d to 1.5 d, more advantageously from 0.8 d to 1.2 d, with d representing the diameter of the pipes. To ensure a planeness of the integration layer, it is desirable that not more than half of the diameter of the pipes juts beyond the layer. On the other hand, to ensure good thermal exchanges with the overlying roadway, the pipes have to be as close as possible to the surface.

A great advantage of the method according to the invention is that compacting may be carried out directly, without requiring additional step(s) of protection of the pipes.

Moreover, the following steps, of application above the integration layer of the surface layer(s) for road surface may be carried out directly, without requiring additional step(s) of protection of the pipes. Indeed, the integration layer makes it possible not only to maintain on the ground the desired geometry but also to protect the pipes.

The asphalt mix is spread according to traditional methods, advantageously using a paver. Hot or lukewarm asphalt mix could be used, with a preference for lukewarm asphalt mix.

In particular, the working temperature of the asphalt mix is below 160° C., advantageously below 140° C., more advantageously below 130° C. In one embodiment, the working temperature of the asphalt mix is between 60° C. and 120° C., advantageously between 90° C. and 120° C.

The pipes of the device are next deposited and indented by compacting in the asphalt mix during their implementation period. By the method according to the invention, the pipes are not damaged, in particular deformed, by the rollers of the compactor and remain in position, whatever their curvature, and thereby including in the loops or bends. The same is true when pavers, including pavers with caterpillar tracks, next pass over the indented pipes.

As is the practice, the compacting could be done in several passes.

Advantageously, no vibration is applied during compacting. Thus, advantageously, during step c) no vibration is applied.

Conditioning the pipes in the form of rolls or slabs makes it possible to ensure high laying speeds. Advantageously, the laying and indentation speed is greater than 2 m/min, more advantageously from 4 m/min to 10 m/min.

The laying of the pipes simultaneously with the conception of the integration layer according to the invention, in particular with a compact asphalt mix, makes it possible to ensure optimal contact between the pipes and the asphalt mix and thereby limit the presence of voids around the pipes. Thus, the method according to the invention does not require the use of a filling material and/or adhesive.

Advantageously, the heat exchanger device integrated in the integration layer does not comprise any metal element. Thus, the materials constituting the device (the pipes, the substrate and optional attachment elements) do not form an obstacle to a recycling, advantageously simultaneously, of the asphalt mix, as has already been described previously.

The addition of pipes, made of polymer, in the surface layer is not detrimental either to its recycling.

The integration layer advantageously comprises less than 10%, more advantageously less than 5%, even more advantageously less than 1%, by volume of polymer per $m^3$ of asphalt mix. Thus, this layer, after planing during reworking of the roadway, may be recycled and re-used without prior treatment.

The thickness of the integration layer advantageously varies from d to 10 cm, more advantageously from d to 8 cm, with d representing the diameter of the pipes.

As mentioned previously, the integration layer may be insulating.

In a complement or in an alternative, the method according to the invention may comprise a step, prior to the spreading of the asphalt mix forming the integration layer according to the invention, of application of a layer of insulating materials.

These insulating materials may for example be a layer of asphalt mix comprising the light aggregates described previously, a cellular glass thermal insulation that comes in the form of plates of 60 cm×45 cm or 120 cm×60 cm format, and composed of rigid and hermetically sealed glass beads sold under the name FOAMGLAS®, polystyrene, etc.

Advantageously, the thermal conductivity, $\lambda$, of the layer of insulating materials is less than 1 W/m·K.

This layer of insulating materials is advantageously implemented when the integration layer is not itself insulating. This layer of insulating materials may also fulfil the function of support layer.

An anchoring layer may be deposited on the integration layer. This anchoring layer makes it possible to improve the anchoring between the asphalt mix of the integration layer and the surface course or the binder course. It also makes it possible to protect the integration layer comprising the heat exchanger device.

The anchoring layer meets the specifications of the NF P 98-150-1 Standard of June 2010.

Advantageously, the method according to the invention comprises the following successive steps:
aaa) If need be, application of a layer of insulating materials, then
aa) If need be, application of an adhesion layer, then
a) spreading at a temperature below 160° C. of the asphalt mix, comprising a granular fraction, a hydrocarbon-based binder, said asphalt mix being workable, having a workability, measured with a Nynas workability meter at the working temperature of the asphalt mix, of less than 400 N, then
b) depositing the pipes, said pipes having a crushing strength greater than 3000 N per linear metre of pipe at 100° C., a thermal expansion less than 200·$10^6$ m/mK at 20° C., then
c) indenting the deposited pipes into said integration layer by compacting said asphalt mix during the workability period of said asphalt mix, to form an integration layer comprising the pipes of a heat exchanger device;
dd) applying an anchoring layer, advantageously a layer of cold asphalt mix, then
d) applying a surface course.

The anchoring layer meets the specifications of the NF P 98-150-1 Standard of June 2010.

It is also possible to deposit above the integration layer or the anchoring layer, if need be, a coloured layer serving as visual warning.

The surface layers of the road surfacing constitute a thermal exchanger operating by capturing or restoring heat, as a function of the climate, of large surface area. In operation, a heat-transfer fluid circulates in the pipes connected to any suitable thermal system, including geothermal ground water at depth, a vertical geothermal probe, a heat pump, etc.

The invention also relates to a method for recycling a road surface according to the invention, comprising a heat exchanger device as defined previously, comprising the following successive steps:
A. Breaking up and removing bound materials including the integration layer comprising the heat exchanger device;
B. Recycling the elements recovered at the preceding step, without operation of sorting or separation of the elements of the heat exchanger device.

A sectional view of a road surfacing comprising on the surface a heat exchanger device is represented in FIG. 1.

The pipes 1, in which a heat-transfer fluid circulates, are indented into an integration layer 2. This integration layer 2 may be of high conductivity or insulating, depending on the nature of the granular fraction of the asphalt mix.

This integration layer 2 is deposited on a support layer 3, which could be an insulating layer. This support layer 3 is advantageously insulating when the integration layer 2 is not itself insulating.

On the integration layer 2 is deposited a surface course 4. This surface course 4 has a high conductivity and constitutes the heat exchanger that is going to capture solar energy or constitutes the surface to heat, notably with a view to snow clearance or ice clearance from the roadway.

Figure 2:
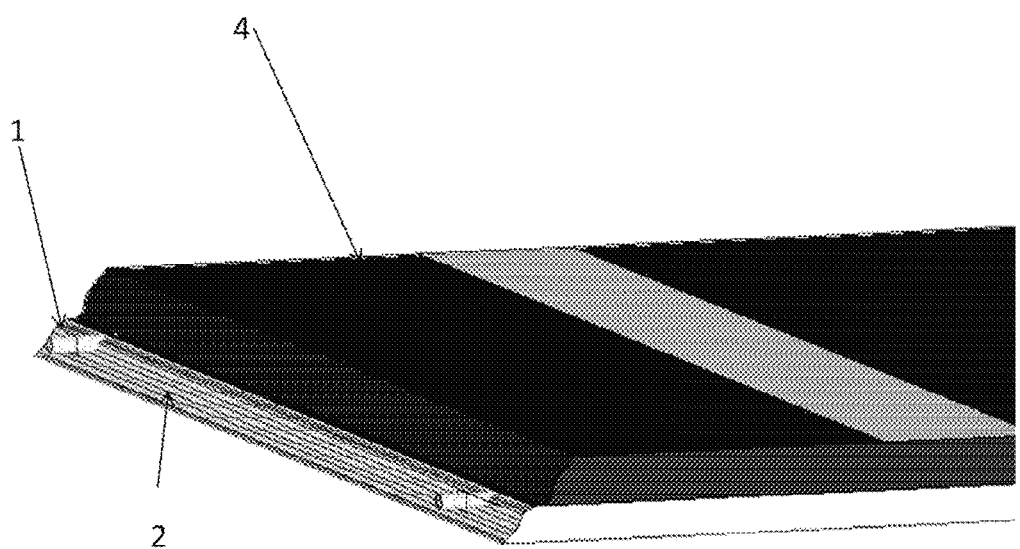

In FIG. 2 is represented the integration layer 2 comprising the pipes 1 on which a surface course 4 is deposited.

Figure 3:
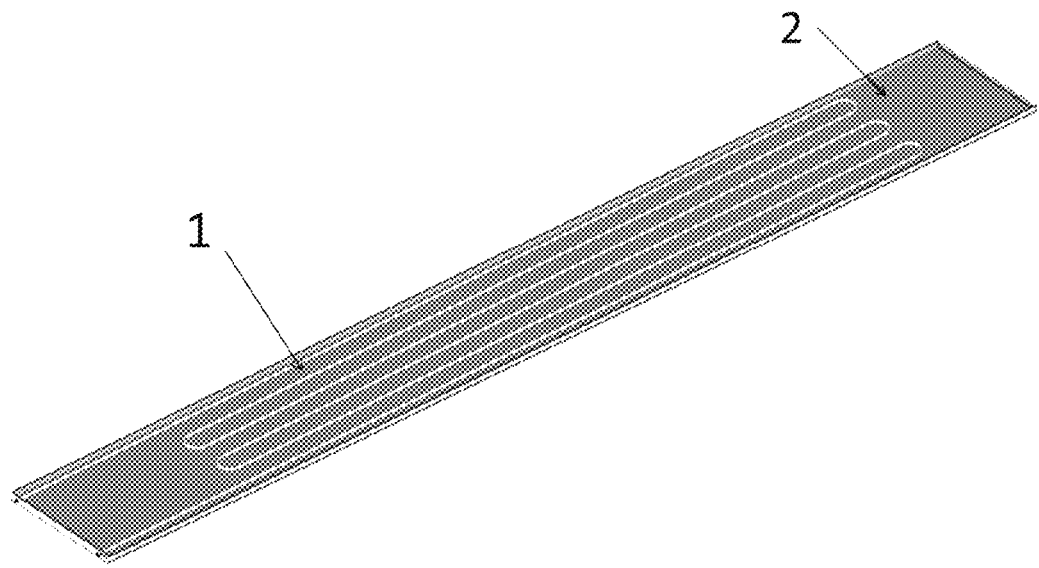

In FIG. 3, an example of possible geometry of the pipes 1 in the integration layer 2 is represented.

Figure 4:
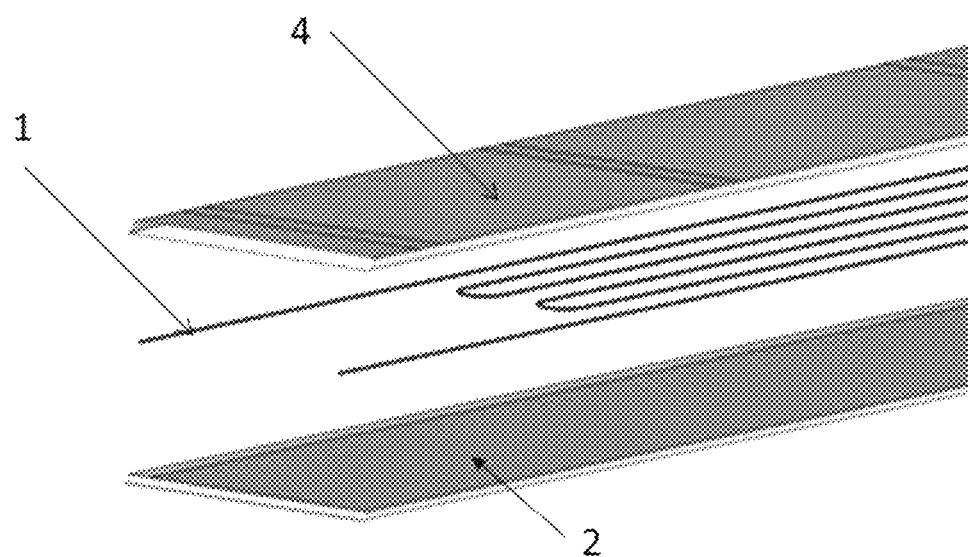

An exploded view of the integration layer 2, of the pipes 1 and of the surface course 4 is represented in FIG. 4.

Protocols:
Workability:
A workability test carried out according to the 98-258-1 Standard, of 2013, and suited:
with a Nynas workability meter (version designated "large volume" and having a width of 30 cm, a length of 32 cm and a height of 13 cm)
to a compactness of the asphalt mix of 75% (void content: 25%)

with a temperature below or equal to the working temperature (suitable temperature)

Compactness:

The compactness of a formula is measured by means of a gyratory shear press (NF EN 12697-31 of August 2007). A cylindrical test specimen of asphalt mix is compacted by combining a rotatory shear action and a resulting axial force applied by a power head.

This test makes it possible to determine the compactness of a test specimen for a given number of gyrations by measuring the associated test specimen height.

Laboratory Indentation Test:

An asphalt mix is implemented on a compacting test bench according to the NF P 12697-33 Standard of September 2007, in a mould of 500 mm×180 mm dimensions at its working temperature. The compactness of the asphalt mix is taken to 75% by compacting with the roller. The pipes are positioned on the surface of the asphalt mix, transversally to the direction of circulation of the roller. They are maintained in place by a scotch tape placed in the direction of circulation of the roller. The pipes are indented into the asphalt mix by 6 to 10 passages of roller. The correct indentation of the pipe is assessed visually on two criteria: the shape of the imprint left by the pipe in the asphalt mix: this must be deep with a dimension close to the diameter of the pipe. The shape of the section of the pipe at the end of the test, said pipe must not be made oval.

Thermal Conductivity Measurements:

To determine the thermal conductivity, a cylindrical test specimen (diameter 16 cm, thickness that can vary, usually 5 cm to 10 cm) of the material to be characterised, after a maturation time of 14 days, is subjected to a difference in temperature: 25° C. on one face, 10° C. on the other face. The measurement of the thermal flux passing through it, the difference in temperature between the faces and the thickness of the test specimen make it possible to determine the thermal conductivity of the material using the relationship:

$$\varnothing = -\lambda \cdot \Delta T/L \text{ with:}$$

$\lambda$ the thermal conductivity expressed in W/m·K $\varnothing$ the thermal flux traversing the test specimen expressed in W/m$^2$ $\Delta T$ the difference in temperature at the edges of the test specimen expressed in ° C. or Kelvin L The height of the test specimen in mm Crushing:

To determine the crushing strength of the pipes, a sample of pipe, of a length between 5 cm and 10 cm, is cut out. This sample is next placed for 2 hours in an oven at a temperature of 100° C. The crushing test is next carried out at the temperature of 100° C. The sample is next positioned, on its generating line, between the two parallel plates of a press, placed in a climatic chamber regulated to 100° C. The press imposes on the sample a displacement of 10 mm/min. The crushing strength value is determined when the diameter of the sample is divided by two compared to the initial diameter of the sample. It is expressed in Newtons per linear metre of pipe using the relationship:

$$Rt = Ft/Lt \text{ with:}$$

Rt: crushing strength of the pipe in N/m

Ft: force developed to crush the pipe up to a reduction of half of its diameter in N Lt: length of the sample subjected to the test in mm Thermal expansion: it is measured according to the NF EN ISO 2505 Standard, of September 2005, Adherence to Bitumen:

The pipes adhere to the bitumen when the following criterion is met: the pipes are smeared with a cationic emulsion of 50/70 bitumen dosed at 65% by weight of bitumen in accordance with the NF EN 13808 Standard of August 2013 using a brush. After one minute, a visual examination is carried out. If the emulsion does not form beads on the surface the adherence of the pipe is sufficient.

The example that follows illustrates the invention and also presents comparative tests. It reports tests carried out in roadwork conditions.

Description of the Samples:

Pipes

Three types of pipes are evaluated:
1. PIPE 1: Pipe made of high density polyethylene, cross-linked with anti-oxygen barrier (AOB) of diameter of 20 mm and wall thickness of 1.9 mm. The expansion coefficient of this pipe is 140.10 m/mK at 20° C. The hot shrinkage, measured according to the NF EN ISO 2505 Standard of September 2005, is less than 3% (in an oven, at 150° C. for 60 min). The crushing strength measured at 100° C. is 3000 N per linear metre of pipe.
2. PIPE 2: Pipe made of high density polyethylene of diameter of 20 mm and wall thickness of 3 mm. The expansion coefficient of the HD-PE is 280·10$^{-6}$ m/mK at 20° C. The crushing strength measured at 100° C. is 10,000 N per linear metre of pipe.
3. PIPE 3: Pipe made of polypropylene of diameter of 17 mm and of wall thickness of 2.2 mm. The expansion coefficient of this pipe is 160·10$^{-6}$ m/mK at 23° C. The hot shrinkage, measured according to the NF EN ISO 2505 Standard of September 2005, is less than 2% (in an oven, at 150° C. for 60 min). The crushing strength measured at 100° C. is 4500 N per linear metre of pipe.
4. PIPE 4: Pipe made of high density polyethylene, cross-linked, of diameter of 16 mm and wall thickness of 2 mm. The expansion coefficient of this pipe is 140·10$^{-6}$ m/mK at 20° C. The hot shrinkage, measured according to the NF EN ISO 2505 Standard of September 2005, is less than 3% (in an oven, at 150° C. for 60 min). The crushing strength measured at 100° C. is 2500 N per linear metre of pipe.

Pipe Support

Several substrates were used as support for the pipe serpentines:
1. SUBSTRATE 1: Geo-grid roadway reinforcement made of glass fibre with mesh size of 25 mm×25 mm, with adhesive surface integrated on one face.
2. SUBSTRATE 2: Geo-grid roadway reinforcement made of glass fibre with mesh size of 25 mm×25 mm.
3. SUBSTRATE 3: Rails made of polypropylene making it possible to clip the pipes to maintain them in shape.
4. SUBSTRATE 4: Grassing slabs made of high density polyethylene.

The sheets of pipes are prefabricated according to several patterns:

transversally (that is to say that the pipes will be arranged perpendicularly to the advancement of the roadworks implementing the plant mix) under a pattern having 4 to 6 parallel straight lines of 4.5 m, spaced apart by 30 cm, and 3 to 5 bends of which the angle of curvature is 180°, or longitudinally (that is to say that the pipes will be arranged parallel to the advancement of the roadworks implementing the plant mix) under a pattern having 4 to 6 parallel straight lines of 4.5 m, spaced apart by 30 cm and 3 to 5 bends of which the angle of curvature is 180°.

The PIPE 3 is prepared beforehand by thermoforming. The tube is laid hot by sprinkling hot water at 80° C. minimum using an apparatus consisting of a heater and an unwinder during step b) to give it the desired shape. During the indentation, there is no longer circulation of water in the pipes. The pipes, of a length of the order to 30 m, are open to the outside at each of the two ends and thus contain nothing other than ambient air.

Asphalt Mix Formula

The following asphalt mix, ASPHALT MIX-1 was used in the laboratory tests:

TABLE 1

| | | % by weight compared to the total weight of the granular fraction |
|---|---|---|
| Granular fraction | Filler* (<0.063 mm) | 9.8% |
| | Sand (0.063-2 mm) Microdiorite/ THIVIERS | 30.8% |
| | Aggregates 2/10 mm Microdiorite/ THIVIERS | 59.4% |
| Bitumen 35/50 | | 5.0%** |
| Workability additive | | None |
| Manufacturing temperature | | 160° C. |
| Workability NF P 98-258-1 of 2013 | | 300 N |
| Rutting (NF EN 12697-22, 2007) | | |
| Number of cycles | | 30,000 |
| Rutting (%) | | 9% |
| PCG (NF EN 12697-31, 2007) | | |
| Number of gyrations | | 60 |
| Voids (%) | | 4.1 |

*filler = fines
**% =, compared to the total weight of the plant mix

Hot produced asphalt mix without sequencing or foaming of the binder. The workability is provided by the manufacturing temperature and the granular backbone.

The following asphalt mix, PLANT MIX-2 was used in the laboratory tests:

TABLE 2

| | | % by weight compared to the total weight of the granular fraction |
|---|---|---|
| Granular fraction | Filler* (<0.063 mm) | 8.9% |
| | Sand (0.063-2 mm) Microdiorite/ THIVIERS | 27.8% |
| | Aggregates 2/10 mm Microdiorite/ THIVIERS | 63.3% |
| Bitumen 13/20 | | 5.4%** |
| Workability additive | | None |
| Manufacturing temperature | | 160° C. |
| Workability NF P 98-258-1 of 2013 | | 500 N |

TABLE 2-continued

| | | % by weight compared to the total weight of the granular fraction |
|---|---|---|
| Rutting (NF EN 12697-22, 2007) | | |
| Number of cycles | | 30,000 |
| Rutting (%) | | 3.2% |
| PCG (NF EN 12697-31, 2007) | | |
| Number of gyrations | | 60 |
| Voids (%) | | 5.1 |

*filler = fines
**% =, compared to the total weight of the asphalt mix

Hot produced asphalt mix, without sequencing.

The following asphalt mix, ASPHALT MIX-3 were used in the worksite test plate tests:

TABLE 3

| | | % by weight compared to the total weight of the granular fraction |
|---|---|---|
| Granular fraction | Filler* (<0.063 mm) | 8.3% |
| | Sand (0.063-2 mm) SGC | 37.1% |
| | Aggregates 2/8 mm SGC | 56.5% |
| Bitumen 35/50 | | 5.0%** |
| Workability additive | | 0.4% |
| Manufacturing temperature | | 140° C. |
| Workability NF P 98-258-1 of 2013 | | 350 N |
| Rutting (NF EN 12697-22, 2007) | | |
| Number of cycles | | |
| Rutting (%) | | — |
| PCG (NF EN 12697-31, 2007) | | |
| Number of gyrations | | 60 |
| Voids (%) | | 5.4 |

*filler = fines
**% =, compared to the total weight of the asphalt mix

Hot produced asphalt mix without sequencing or foaming of the binder. The workability is provided by the workability additive and the granular backbone.

The workability additive is a hydrogenated ricin oil having the following characteristics:

| | |
|---|---|
| Melting point (° C.) | 84-89 |
| Acid index (mg KOH/g) | ≤2 |
| Saponification index (mg KOH/g) | 174/186 |
| Iodine index (gI$_2$/100 g) | ≤3.5 |
| Hydroxyl index (mg KOH/g) | 155-165 |
| Acetyl index | ≥139 |
| Unsaponifiables (%) | ≤1.0 |

This hydrogenated ricin oil has, after saponification, approximately the following fatty acid composition (percentages expressed by weight compared to the total weight):
87% of 12-hydroxy-octadecanoic acid
11% of stearic acid
2% of palmitic acid
traces of (9, 10)-dihydroxystearic acid Results For SUBSTRATES 1 to 3, the prefabricated sheet is arranged directly on the plant mix at the paver output before being indented by the compactor. The paver is of ABG 7820 type with a screed width adjustable from 2.5 to 5 m; it made it possible to lay a 5 m wide road in a single pass. The compactor is of Hamm DV 90 type (tandem vibrant), its weight is around 9 tonnes.

The results are reported in the following table:

TABLE 4

| Nature of the pipe | Substrate | Realisation | Observations |
|---|---|---|---|
| PIPE 1 | SUBSTRATE 1 SUBSTRATE 2 | The sheet is arranged transversally directly on the asphalt mix at the paver output before being indented by the compactor | Lack of adherence of the pipe Lack of rigidity of the pipe (crushing, flattening of the pipe) for this workability of asphalt mix |
| PIPE 1 | SUBSTRATE 1 SUBSTRATE 2 | The sheet is arranged longitudinally directly on the asphalt mix at the paver outlet before being indented by the compactor | Difficulty of implementation: lack of adherence implying a displacement leading to the destruction of the prefabricated sheet |
| PIPE 2 | SUBSTRATE 1 SUBSTRATE 2 | Sheets of pipes fixed onto adhesive and non-adhesive grids are arranged transversally directly on the asphalt mix at the paver outlet before being indented by the compactor | Rigidity of the pipes sufficient: No ovalisation of the pipe Adherence of the pipe satisfactory Significant thermal shrinkage leading to the exiting of the pipes at the level of the bends No significant difference as a function of the substrate |
| PIPE 2 | SUBSTRATE 1 SUBSTRATE 2 | The sheet is arranged longitudinally directly on the asphalt mix at the paver output before being indented by the compactor | Difficulty of implementation longitudinally: displacement of the sheet during the compacting step |
| PIPE 3 | SUBSTRATE 1 | The sheet is arranged transversally directly on the asphalt mix at the paver outlet before being indented by the compactor | Rigidity of the pipes sufficient: no ovalisation of the pipe Adherence of the pipe satisfactory No shrinkage of the pipes which remain indented |
| PIPE 3 | SUBSTRATE 1 | The sheet is arranged transversally longitudinally directly on the asphalt mix at the paver outlet before being indented by the compactor | Rigidity of the pipes sufficient: No ovalisation of the pipe Satisfactory adherence of the pipe The pipes remain indented |
| PIPE 1 | SUBSTRATE 4 | A pipe serpentine is fixed onto stabilisation slabs before application of the asphalt mix | Destruction of the sheet on the passage of the paver: The sheets are not integral with the ground support and are deformed on the passage of the paver. |
| Outside the method according to the invention - INVPIPE 3 | — | The shaped pipes are deposited on the ground and held by clips before application of the asphalt mix | The pipes deform during the passage of the paver, that is to say during the application of the asphalt mix Appearance of surface fissuring |

It emerges from this series of tests that the choice of a workable (350 N) 0/6 asphalt mix makes it possible to indent the pipes, not protected, without deforming or damaging them, from the moment that they are sufficiently rigid (crushing strength greater than 4500 N per linear metre of pipe at 100° C.), and for this type of asphalt mix, adherent to the bitumen. In a workable (350 N) 0/6 asphalt mix, a pipe having a crushing strength greater than 4500 N per linear metre of pipe at 100° C. and a controlled thermal expansion (expansion coefficient less than $160 \cdot 10^6$ m/mK at 20-25° C.) makes it possible to obtain satisfactory results without thermal and/or mechanical protection means, in particular without cooling or without pressurisation.

The integration layer is necessary and sufficient to protect the pipes during the passage of site machinery.

When the pipes may be shaped by shape memory, the use of a substrate does not seem useful.

It should be noted that to indent less rigid pipes (crushing strength between 3000 N and 4500 N per linear metre of pipe at 100° C.), it is necessary to increase the workability of the asphalt mix.

Other laboratory results:

Indentation tests were carried out at the laboratory model scale.

The results are reported in the following table:

TABLE 5

| | PIPE-1 | PIPE-2 | PIPE-3 | PIPE-4 |
|---|---|---|---|---|
| ASPHALT MIX-1 Very workable Without additive | Satisfactory indentation | Satisfactory indentation | Satisfactory indentation | Pipe totally crushed |
| ASPHALT MIX-2 Not very workable Without additive | Poor indentation with ovalisation of the pipe | Satisfactory indentation | Poor indentation with ovalisation of the pipe | Pipe totally crushed |
| ASPHALT MIX-3 Workable With additive | Poor indentation with ovalisation of the pipe | Satisfactory indentation | Satisfactory indentation | Pipe totally crushed |

The invention claimed is:

1. A method for manufacturing a road surfacing comprising on the surface the pipes of a heat exchanger device, comprising the following steps:
   a) spreading at a temperature below 160° C. asphalt mix to form an integration layer, wherein,
   the asphalt mix comprises a granular fraction and a hydrocarbon-based binder,
   the asphalt mix has a workability from 50 N to less than 400 N and,
   the workability is measured according to the 98-258-1 Standard of 2013 with a Nynas workability meter at the working temperature of the asphalt mix;
   b) depositing the pipes on said integration layer, wherein, the pipes are made of polymer,
   the pipes have a crushing strength greater than 3000 N per linear metre of pipe at 100° C.,
   the pipes have a thermal expansion less than $200 \cdot 10^{-6}$ $K^{-1}$ at 20° C. in such a way as to enable the indentation of the pipes in the integration layer even in the absence of cooling means or pressure application means;
   c) indenting the deposited pipes into said integration layer by compacting said asphalt mix during the workability period of said asphalt mix to form an integration layer comprising the pipes of a heat exchanger device; and
   d) applying a surface layer there above for the road surface.

2. The method according to claim 1, wherein a geometry is imposed on the pipes of the heat exchanger device before the deposition step b).

3. The method according to claim 1, wherein during step c) no vibrations are applied.

4. The method according to claim 1, wherein the compactness of the asphalt mix is greater than 90%, the compactness is measured by means of a gyratory shear press at 60 gyrations, according to the NF EN 12697-31 Standard of August 2007.

5. The method according to claim 1, wherein the thermal conductivity λ of the asphalt mix is greater than or equal to 1 W/m·K.

6. The method according to claim 1, wherein the heat exchanger device indented into said integration layer does not comprise any metal element.

7. The method according to claim 1, wherein the thickness of the integration layer varies from d to 10 cm, with d representing the diameter of the pipes.

8. The method according to claim 1, comprising a step, prior to the spreading of the asphalt mix of the integration layer, of application of a layer of insulating materials.

9. The method according to claim 1, wherein the surface applied in step d) is a surface course.

10. The method according to claim 1, wherein the pipes are not filled with a cooling liquid during step c) of indentation of the pipes in the integration layer.

11. The method according to claim 1, wherein the indentation depth varies from 0.5 d to 1.5 d, with d representing the diameter of the pipes.

12. The method according to claim 11, wherein the indentation depth varies from 0.8 d to 1.2d, with d representing the diameter of the pipes.

13. The method according to claim 1, wherein the working temperature of the asphalt mix is below 130° C.

14. The method according to claim 13, wherein the working temperature of the asphalt mix is between 60° C. and 120° C.

15. The method according to claim 13, wherein the working temperature of the asphalt mix is between 90° C. and 120° C.

16. The method according to claim 1, wherein the workability of the asphalt mix is from 50 N to less than 300 N, the workability is measured with a Nynas workability meter at the working temperature of the asphalt mix, advantageously less than 250 N.

17. The method according to claim 16, wherein the workability of the asphalt mix is from 50 N to less than 250 N.

18. The method according to claim 1, wherein the binder comprises a workability additive having a melting point above 60° C. and below 130° C.

19. The method according to claim 18, wherein the workability additive is a trigylceride of fatty acids, the fatty acid being selected from the group constituted of saturated fatty acids comprising from 12 to 30 carbon atoms substituted or not.

20. The method according to claim 19, wherein the fatty acid is substituted by at least one hydroxyl function or by a $C_1$-$C_4$ alkyl radical.

21. The method according to claim 19, wherein the fatty acid is selected from the group constituted of 12-hydroxy-octadecanoic acid, hexadecanoic acid, octadecanoic acid, 9,10-dihydroxy-octadecanoic acid, icosanoic acid, nonadecanoic acid, and mixtures thereof.

22. The method according to claim 1, wherein the elements of the granular fraction of the asphalt mix have dimensions between 0 mm and 10 mm.

23. The method according to claim 22, wherein the elements of the granular fraction of the asphalt mix have dimensions between 0 mm and 6 mm.

24. The method according to claim 1, wherein the thermal conductivity λ of the asphalt mix is less than 1 W/m·K.

25. The method according to claim 24, wherein the granular fraction of the asphalt mix comprises elements selected from light aggregates of specific gravity less than 1.6 t/m³.

26. The method according to claim 25, wherein all or part of the light aggregates are non-absorbent light aggregates having a water absorption coefficient less than 15%.

27. The method according to claim 1, wherein the asphalt mix is resistant to rutting.

28. The method according to claim 27, wherein the asphalt mix is resistant to rutting with a percentage rutting after 30,000 cycles of less than 7.5%.

29. The method according to claim 27, wherein the asphalt mix is resistant to rutting with a percentage rutting after 30,000 cycles of less than 5%.

30. The method according to claim 1, wherein the combined thickness of the layer(s) applied thereafter on said integration layer is less than 30 cm.

31. The method according to claim 30, wherein the combined thickness of the layer(s) applied thereafter on said integration layer is less than 10 cm.

32. A method for recycling a road surface, comprising a heat exchanger device on the surface, as defined in claim 1, the heat exchanger device indented into said integration layer not comprising any metal element comprising the following successive steps:
   i. breaking up and removing bound materials including the integration layer comprising the heat exchanger device;
   ii. recycling the elements recovered at the preceding step, without operation of sorting or separating the elements of the heat exchanger device.

* * * * *